United States Patent [19]
Lis et al.

[11] Patent Number: 5,840,884
[45] Date of Patent: Nov. 24, 1998

[54] METHOD FOR CONTROLLING CRYSTAL MORPHOLOGY OF INULIN

[75] Inventors: Daniel G. Lis, Wheeling; Lisa Anne Preston, Chicago, both of Ill.

[73] Assignee: Kraft Foods, Inc., Northfield, Ill.

[21] Appl. No.: 805,206

[22] Filed: Feb. 27, 1997

Related U.S. Application Data

[60] Provisional application No. 60/012,620 Mar. 1, 1996.

[51] Int. Cl.$^6$ .............................. C07H 1/06; C08B 37/18
[52] U.S. Cl. ......................... 536/127; 426/658; 536/123; 536/123.1; 536/124
[58] Field of Search ............................ 426/658; 536/123, 536/123.1, 124, 127

[56] References Cited

U.S. PATENT DOCUMENTS

| | | | |
|---|---|---|---|
| 3,800,036 | 3/1974 | Gabby et al. | 426/164 |
| 4,564,525 | 1/1986 | Mitchell et al. | 426/104 |
| 4,724,136 | 2/1988 | Scheibl | 424/50 |
| 4,758,515 | 7/1988 | Barwald et al. | 435/99 |
| 4,762,726 | 8/1988 | Soucie et al. | 426/602 |
| 4,954,621 | 9/1990 | Masaoka et al. | 536/124 |
| 4,954,622 | 9/1990 | Cooper | 536/127 |
| 5,051,408 | 9/1991 | Cooper | 514/54 |
| 5,104,674 | 4/1992 | Chen et al. | 426/573 |
| 5,127,956 | 7/1992 | Hansen et al. | 127/42 |
| 5,238,698 | 8/1993 | Zumbe et al. | 426/572 |
| 5,254,174 | 10/1993 | Hansen et al. | 127/53 |
| 5,266,348 | 11/1993 | Zumbe et al. | 426/660 |
| 5,273,772 | 12/1993 | Cooper | 426/611 |
| 5,294,455 | 3/1994 | O'Brien et al. | 426/573 |
| 5,429,830 | 7/1995 | Janovsky et al. | 426/94 |
| 5,478,732 | 12/1995 | Kunz et al. | 435/101 |
| 5,501,869 | 3/1996 | Buliga et al. | 426/658 |
| 5,569,483 | 10/1996 | Timonen et al. | 426/658 |

FOREIGN PATENT DOCUMENTS 0 664 299 A1  7/1995  European Pat. Off. .

OTHER PUBLICATIONS

Le Roux et al. *Ind. Aliment. Agric.*, vol. 95(6) : 597–605, 1978.
Marchessault et al. *Can. J. Chem.*, vol. 58 : 2415–2422, 1980.
Cooper and Carter. *Molecular Immunology*, vol. 23(8): 895–901, 1986.
Cooper and Steele. *Vaccine*, vol. 9, pp. 351–357, May 1991.
Sawada et al. *Carbohydrate Res.*, vol. 214: 7–17, 1991.
Rusak and Plese. *Acta Botanica Croatica*, vol. 52: 13–16. * *, 1991.
Andre et al., *International Journal of Biological Macromolecules*, vol. 18(3) : 195–204, 1996.

*Primary Examiner*—Marian C. Knode
*Assistant Examiner*—Howard C. Lee
*Attorney, Agent, or Firm*—Fitch, Even, Tabin & Flannery

[57] ABSTRACT

A method for controlling and/or modifying the morphology of inulin is provided. Using this method, inulin can be produced having, as desired, a predominately needle-like morphology or a predominately obloid-type morphology. The controlled morphology inulin of the present invention (i.e., needles, obloids, or combinations thereof) can be used in low-fat and/or fat-free viscous food products where the inulin acts as a fat mimetic. By controlling the morphology of inulin used in such food products, better control of organoleptic and physical properties of the food product can be obtained.

26 Claims, 8 Drawing Sheets

METHOD FOR CONTROLLING CRYSTAL MORPHOLOGY OF INULIN

RELATED APPLICATION

This application is based on, and claims benefit of, United States Provisional Application Ser. No 60/012,620, filed Mar. 1, 1996, abandoned.

FIELD OF THE INVENTION

The present invention generally relates to a method for controlling and/or modifying the crystalline morphology of inulin. More specifically, the present invention relates to a method by which inulin can be produced having, as desired, a predominately needle-like crystal morphology or a predominately obloid-type crystal morphology. The controlled morphology inulin of the present invention (i.e., needles, obloids, or combinations thereof) can be used in low-fat and/or fat-free viscous food products where the inulin acts as a fat mimetic. By controlling the morphology of inulin used in such food products, better control of organoleptic and physical properties of the food product can be obtained.

BACKGROUND OF THE INVENTION

In recent years considerable attention has been directed to the provision of various food products having reduced fat and caloric content. For example, various sucrose fatty acid polyesters have been proposed as fat mimetics. Such sucrose fatty acid polyesters are not naturally-occurring in human diets and have not been generally approved for use in food compositions. It would be desirable, therefore, to provide fat mimetics which are naturally-occurring in foods already included in the human diet. Inulin, which is found in various plant tubers, such as dahlia, sunchoke flour, jerusalem artichokes, and chicory, is a naturally-occurring fat mimetic.

Unfortunately, it has been difficult to incorporate inulin directed into foodstuffs while maintaining the desired textural, sensory, and/or organoleptic properties of the foodstuff. The inability to incorporate inulin directly into foodstuffs is at least partially due to its limited water solubility. Inulin is commercially available in spray dried form which generally provides for highly agglomerated, large particles. Incorporation of high levels of such inulin directly into foodstuffs often results in a sandy or gritty texture.

Patent Publication WO 93/06744 A1 (assigned to Tirlemontoise Refinery, Ltd. of Brussels, Belgium) attempted to provide an inulin-containing cream composition which could be added to foodstuffs without causing such a sandy texture. The process of Patent Publication WO 93/06744 A1 (i.e., Rafticreming®) generally involves mixing inulin in a liquid (e.g., water) and then subjecting the mixture to significant shear forces to produce a stable, cream composition. The inulin-containing cream composition can then be added directly to food compositions. This Patent Publication also notes, without providing further details, that the cream composition can be formed in situ if the concentration of inulin is "high enough to produce a cream" when the food composition is exposed to high shear. Of course, exposures of the final food composition to such high levels of shear may destroy or adversely affect the desired textural and/or organoleptic characteristics of the foodstuff.

Solutions or suspensions of food hydrocolloids (such as, for example, gums, starches, modified starches, and modified cellulose) have been used to prepare low-fat viscous and pourable dressings. Such hydrocolloid-containing dressings generally have less than optimal organoleptic properties. Specifically, such viscous dressings tend to be mouth drying and dull in appearance with a medicinal and/or astringent aftertaste.

It would be desirable, therefore, to provide inulin products which allow the preparation of low-fat and/or fat-free food products with good organoleptic properties using inulin as a fat mimetic. It would also be desirable to provide a method for controlling the morphology of inulin. It would also be desirable to provide a method for preparing low-fat and/or fat-free food products containing controlled-morphology inulin wherein the inulin morphology contributes to the desired organoleptic and/or physical properties of the food product. The present invention provides such methods.

DESCRIPTION OF THE DRAWINGS

FIGS. 1A and 1B are photomicrographs of commercially available inulin. FIG. 1A is spray-dried inulin; FIG. 1B is agglomerated spray dried inulin. Both inulin samples are in the as received dried form (i.e., in air).

FIG. 12 shows the viscosity (Brookfield) behavior of pourable dressings prepared with various inulin samples immediately after preparation and after one day. Pourable dressings 1, 2, and 3 were prepared using inulin (35 weight percent aqueous mixture) heated to 180° F.: for dressing 1, inulin was added hot (no cooling; obloids formed in situ upon cooling of dressing) for dressing 2, inulin was cooled without shearing (obloids) before addition; and for dressing 3, inulin was cooled with shearing (agglomerated obloids) before addition. Pourable dressings 4, 5, and 6 were prepared using inulin (35 weight percent aqueous solution) heated to 120° F.: for dressing 4, inulin was added hot (no cooling; needles formed in situ upon cooling of the dressing), for dressing 5, inulin was cooled without shearing (needles) before addition; and for dressing 6, inulin was cooled with shearing (agglomerated needles) before addition. Pourable dressing 7 was prepared using inulin (35 weight percent aqueous solution) at 72° F. (no heating; small needles with spray-dried fragments).

FIG. 13 shows the Haake Yields of viscous dressings prepared with various inulin samples immediately after preparation and after one day. Viscous dressings 1, 2, and 3 were prepared using inulin (35 weight percent aqueous solution) heated to 180° F.: for dressing 1, inulin was added hot (no cooling; obloids formed in situ upon cooling of the dressing), for dressing 2, inulin was cooled without shearing (obloids) before addition; and for dressing 3, inulin was cooled with shearing (agglomerated obloids) before addition. Viscous dressings 4, 5, and 6 were prepared using inulin (35 weight percent aqueous solution) heated to 120° F.: for dressing 1, inulin was added hot (no cooling; needles formed in situ upon cooling of the dressing), for dressing 2, inulin was cooled without shearing (needles) before addition; and for dressing 3, inulin was cooled with shearing (agglomerated needles) before addition. Viscous dressing 7 was prepared using inulin (35 weight percent aqueous solution) at 72° F. (added warm; small needles with spray-dried fragments).

SUMMARY OF THE INVENTION

This invention generally relates to a process for preparing inulin with a desired crystalline morphology. More specifically, the present invention relates to a process for preparing inulin with controlled and varied amounts of needle-like or obloid-like crystal particles. The needle-like and obloid-like inulin of the present invention are both crystalline materials. In addition, by varying the process conditions, varying particle sizes of the needle-like or obloid-like crystalline inulin can be obtained.

For purpose of this invention, "needle" or "needle-like" is intended to characterize a crystalline morphology approximating a spindle- or needle-shaped crystal. Generally the average ratio of the minor axis length to the major axis length in such needles is less than about 0.3, preferably about 0.1 to 0.3, and most preferably about 0.125. Generally the length of the needles is between about 1 to 20 microns and preferably between about 2 and 15 microns. For purposes of this invention, "obloid" is intended to characterize a crystalline morphology approximating an ellipsoid-shaped crystal, a football-shaped crystal, or a paramecium shaped crystal. Generally the ratio of the minor axis length to the major axis length in such obloids is greater than about 0.5, preferably between about 0.6 to 0.8, and most preferably about 0.6. Generally the major axis of the obloids is between about 1 to 20 microns and preferably between about 3 and 15 microns. In the obloids of this invention, the crystalline planes appear to curve into one another to form the crystalline obloid shape.

Using the method of the present invention, the inulin crystal morphology used in various food product can be varied to obtain better combinations of organoleptic and physical properties for a wide variety of low-fat and/or fat-free food products that incorporate inulin as a fat mimetic. For purposes of this specification, the terms "low-fat" and "fat-free" are generally used interchangeably and only differ in the relative amounts of fat contained in the final product. Generally, a low-fat product contains less than about 25 weight percent fat and a fat-free product contains less than about 2 weight percent fat. For purposes of this invention, "low-fat" is also intended to include "fat-free."

One object of the present invention is to provide a method for controlling the crystalline morphology of inulin, said method comprising;

(1) forming an aqueous mixture containing about 10 to 50 weight percent inulin;

(2) heating the aqueous mixture to a temperature below or above a crystal transition temperature and maintaining that temperature for at least about five minutes; and (3) cooling the heated aqueous mixture to ambient temperature to obtain at least 70 weight percent inulin needle crystals if the temperature in step (2) is below the transition temperature and to obtain inulin obloid crystals with essentially no needle crystals if the temperature in step (2) is above the transition temperature.

Another object of the present invention is to provide a method for controlling the crystalline morphology of inulin, said method comprising:

(1) forming an aqueous mixture containing about 10 to 50 weight percent spray-dried inulin with inulin needle crystals and spray-dried particles present therein;

(2) heating the aqueous inulin containing mixture to a temperature below the crystal transition temperature of the aqueous mixture such that a sufficient number of inulin needle crystals remain to act as seed crystals; and (3) cooling the aqueous mixture to form an aqueous mixture wherein at least 70 weight percent of the inulin is in the form of needle crystals.

Still another object of the present invention is to provide a method for controlling the crystalline morphology of inulin, said method comprising:

(1) forming an aqueous mixture containing about 10 to 50 weight percent inulin whereby inulin;

(2) heating the aqueous inulin containing mixture to a temperature above the crystal transition temperature of the aqueous mixture and holding the aqueous mixture at that temperature for a time sufficient to insure that essentially no inulin needle crystals remain to act as seed crystals; and (3) cooling the aqueous mixture to form an aqueous mixture containing obloid inulin crystals with essentially no inulin needle crystals or spray-dried inulin particles.

These as well as other objects and advantages of the present invention will be apparent from a consideration of the present specification.

DESCRIPTION OF THE PREFERRED EMBODIMENTS

The present invention relates to methods for controlling the crystalline morphology of inulin. Using the techniques of the present invention, needle-like inulin crystals or obloid-like inulin crystals can be obtained as desired. The present method is carried out by heating an aqueous inulin containing mixture above or below the crystal transition temperature for the aqueous mixture and then cooling the mixture. If the temperature is maintained below the crystal transition temperature, then needle-like inulin crystals are obtained upon cooling. If the temperature is raised above the crystal transition temperature for a time sufficient to dissolve essentially all needle-shaped crystals, then inulin obloid crystals are obtained upon cooling. Moreover, the average particle sizes of the needle and/or obloid crystals can also be varied by changing the specific hydration conditions in their respective temperature ranges.

For purposes of this invention, the crystal transition temperature is that temperature at which the crystallization goes from needle to obloid crystal formation upon cooling. Although not wishing to be limited by theory, it is believed that the crystal transition temperature is the minimum temperature at which all needle crystals dissolve or melt in the aqueous mixture to form an inulin solution. It appears that if a significant amount of needle crystals remain after heating, crystallization upon cooling will be seeded or controlled by the needles present and needle crystals will be formed. If essentially no needle crystals are present after heating, then crystallization upon cooling will result in the obloid crystal morphology. As one skilled in the art will realize, the actual transition temperature will vary depending on the inulin used, the inulin concentration, other ingredients (if any), heating rates, and time at the maximum elevated temperature. Generally, for inulin concentrations of about 10 to 50 weight percent, the crystal transition temperature will be in the range of about 165° to 210° F. An aqueous solution containing about 35 weight percent inulin will generally have a transition temperature of about 174° to 177° F. The transition temperature can easily be determined for an inulin mixture by simply varying the maximum temperature over a series of samples and then determining whether needle crystals or obloid crystals are obtained upon cooling.

In addition to controlling the crystalline morphology by heating the inulin containing aqueous mixture to above or below the crystal transition temperature, the morphology of the needle crystals or obloid crystals, respectively, can be modified by varying the hydration and cooling conditions. For example, the size of the needle crystals can be increased by raising the temperature of the aqueous inulin mixture to a value close to, but still under, the crystal transition temperature. Generally, the lower the temperature to which the mixture is heated, the smaller are the needles formed but the greater the amount of spray-dried particles and fragments thereof that will be retained. Moreover, by applying moderate shear during the cool down period, the amount of aggregation of the needles can be increased. Generally such aggregated needles result in better physical properties when the inulin is used in low-fat and/or fat-free food products. Generally the processing conditions for needle-like crystal formation is provided in the following table:

|  | Temp. (°F.) | Inulin Conc. (%) |
| --- | --- | --- |
| Overall range | 45–170 | 10–50 |
| Preferred range | 72–140 | 20–40 |
| Most preferred range | 110–120 | 30–35 |

It has been determined that if the heated aqueous inulin mixture is subjected to shear during cooling aggregates of needle-like crystals are formed. If the heated mixture is cooled without shear, i.e., quiescently, no aggregates are formed. When aggregates of needle crystals are desired, the shear rate during the cooling portion is generally maintained at less than 1000 sec$^{-1}$, preferably between about 5 to 500 sec$^{-1}$, and most preferably between about 10 to 150 sec$^{-1}$. The cooling rate during the cooling portion is generally less than about 600° F./min, preferably between about 0.05° to 20° F./min, and most preferably between about 0.15° to 0.5° F./min. Generally, operation at the low end of the temperature range (about 45°–75° F.) results in smaller needles (length of about 2–3 microns) with significant amounts of gritty (and generally undesirable) spray-dried particle fragments. When the high end of the temperature range (about 140°–170° F.) is used, significantly fewer spray-dried particles are present but the needles tend to be long (approaching 10 microns or higher). Although not wishing to be limited by theory, it appears that the formation of larger size needle crystals at higher temperature is due to the fewer number of needle nuclei present at the conclusion of the heating step. Generally, the greater the number of needle nuclei, the smaller are the resulting needle crystals upon cooling to ambient conditions. For most applications, needle containing inulin preferably contains needle crystals about 3 to 5 microns in length, on average, and less than about 10 weight percent spray-dried fragments.

Generally the processing conditions for obloid crystal formation is provided in the following table:

|  | Temp. (°F.) | Inulin Conc. (%) |
| --- | --- | --- |
| Overall range | 175–210 | 10–50 |
| Preferred range | 175–190 | 20–40 |
| Most preferred range | 175–180 | 30–35 |

The application of shear during cooling also causes aggregation of the obloid crystals while cooling without shear avoids aggregation. The same rates and cooling rates may be used during obloid crystal formation as are used when forming needle-like crystals. Operation at the low end of the temperature range (about 175°–185° F.) results in smaller obloid crystals (major diameter of about 2–5 microns), while at the high end of the temperature range (about 190°–210° F.), the obloid crystals tend to be larger (about 7 to 15 microns). Thus, generally larger obloids are obtained the higher the temperature is raised above the crystal transition temperature. Moreover, by applying moderate shear during the cool down period, the amount of aggregation of the obloids can be increased. Generally non-aggregated obloids result in better physical properties when the inulin is used in low-fat and/or fat-free food products.

Figure 1A:
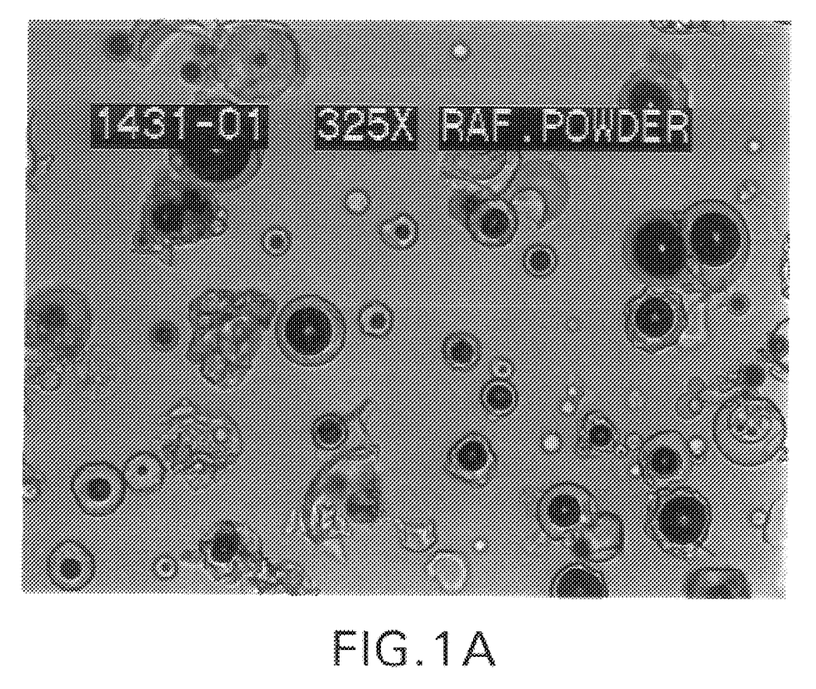
Figure 1B:
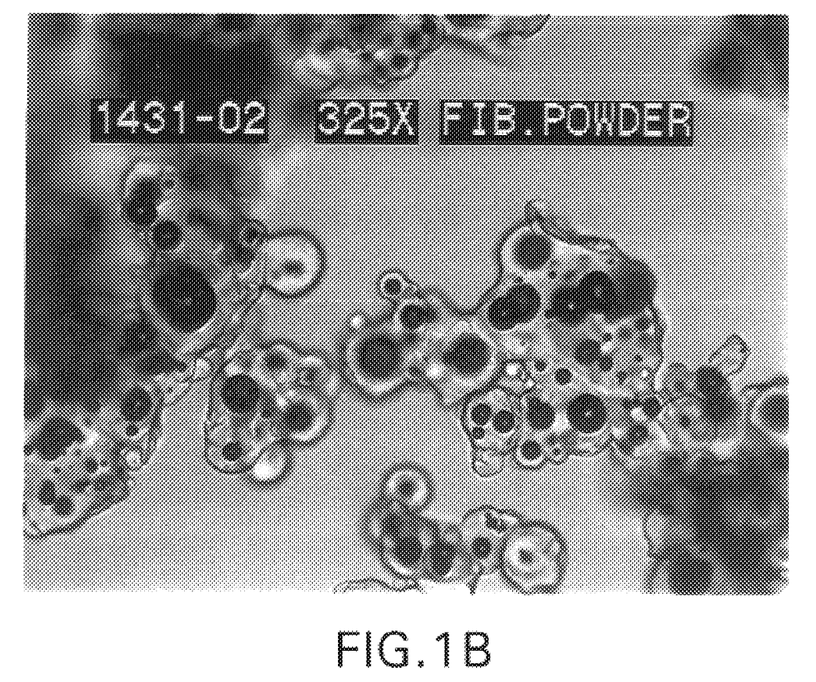
Figure 2A:
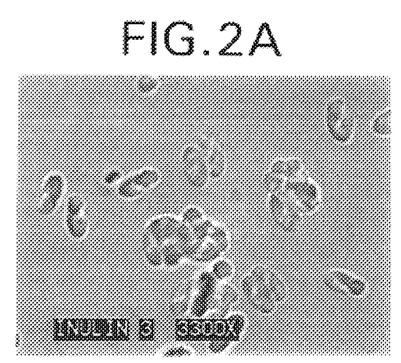
FIGS. 2A, 2B, 2C, and 2D are photomicrographs of obloid-shaped inulin prepared by the method of this invention, by cooling a 35 weight percent aqueous inulin solution from about 180° F.
Figure 2B:
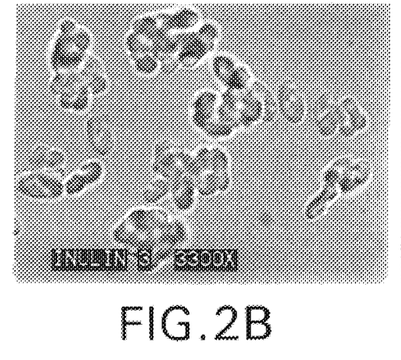
Figure 2C:
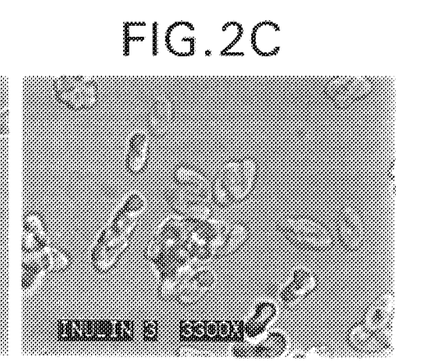
Figure 2D:
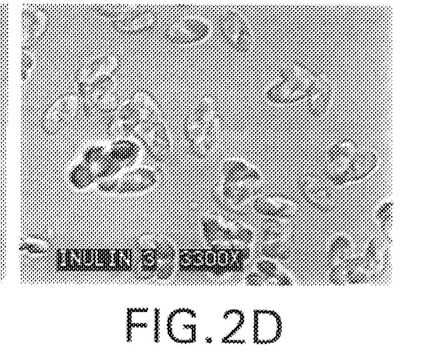

Inulin is commercially available in a spray-dried form (see FIG. 1A) and in an agglomerated form (see FIG. 1B). Commercially available inulin (both spray-dried and agglomerated) is a non-crystalline solid. Inulin is a polysaccharide or mixture of polysaccharides containing β-1,2 bonded glucofructan polymers of varying molecular weights terminated at the reducing end by a glucose ring. Thus, inulin is a series of repeating five member fructose rings terminated by a six member glucose ring. Inulin is often represented by $GF_n$ where G is a glucose ring, F is a fructose ring, and n is the number of fructose rings. Inulin is often derived from various plant tubers, such as dahlia, sunchoke flour, jerusalem artichokes, and chicory. Generally inulin prepared from chicory is preferred in the present invention. The number of fructose rings (i.e., the n value) generally varies between 2 to 15 in extracted inulin from plant sources. The average value of n is generally in the range of about 8 to about 13 and is dependent on the extraction processing conditions. Generally inulin of general formula $GF_n$ are non-digestible for n values greater than two.

Preferably the inulin starting material used in the present invention has an average n value of about 6 to 12 and has a number average molecular weight of about 1000 to 2000. Preferably the inulin starting material used in the present invention contains about 70 weight percent $GF_n$ where n is greater than or equal to about 7. One especially preferred inulin starting material is Instant Fibruline from Cosuera.

The controlled morphology inulin of this invention—either needles or obloids—can be used as a fat mimetic in various food compositions. Generally low-fat and/or fat/free products of this invention contain from about 2 to 20 weight percent inulin having controlled crystal morphology. Examples of such low-fat and/or fat-free food products include viscous and pourable dressings, cheese, cheese products, frozen deserts, yogurt, frostings, icings, and the like. Generally, the controlled crystal morphology inulin of this invention can be used in any food product in which conventional forms of inulin can be used. Generally, smoother products can be obtained using obloid inulin crystals. It appears that the obloids can act as "ball bearings" thereby increasing the perceived lubricity of the product in the mouth. Preferably the obloid crystals have an average major diameter of about 3 to 7 microns.

Figure 10:
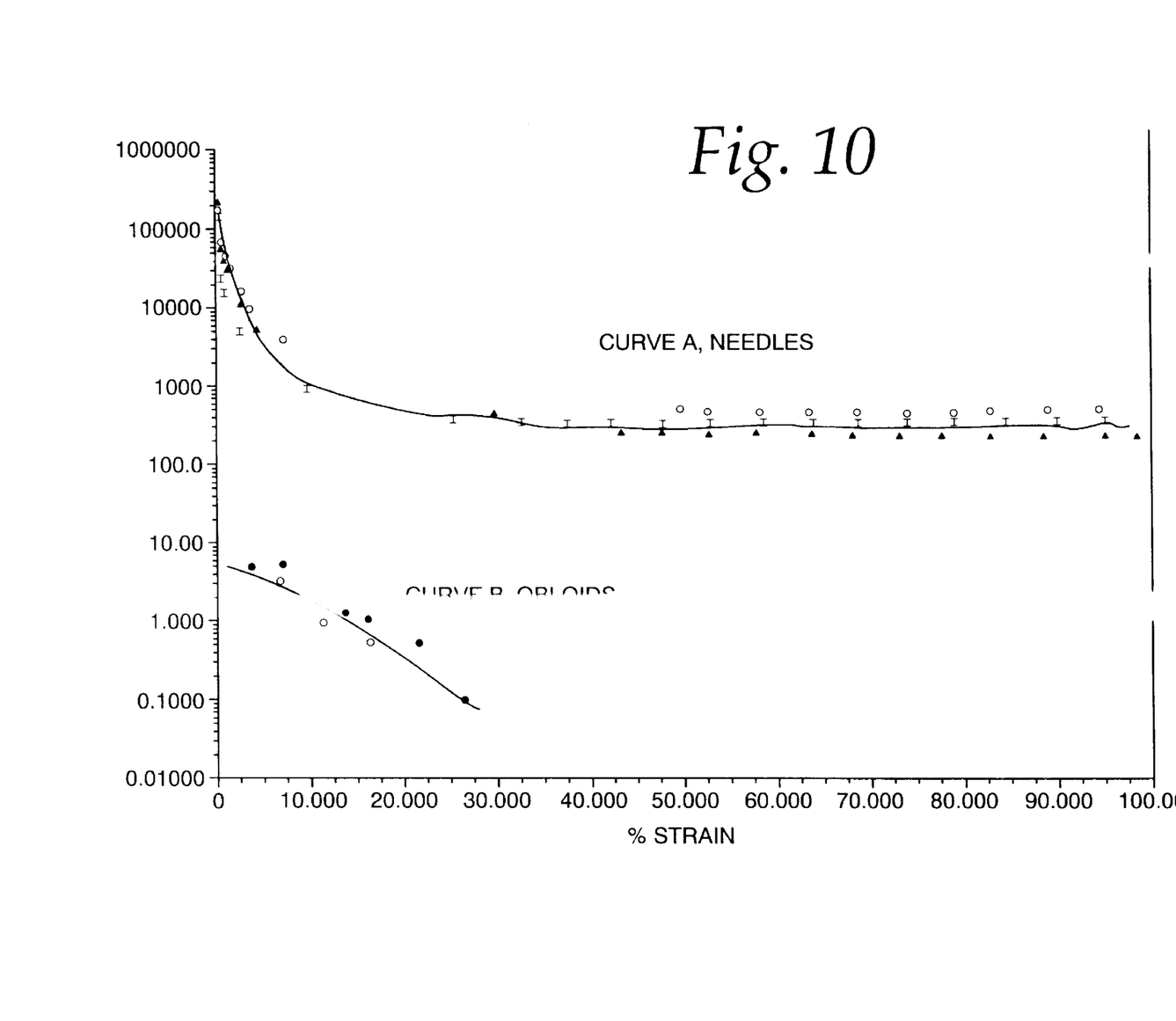
FIG. 10 shows the gel strength (as measured by the storage modulus as a function of strain) for needles (Curve A) and obloids (Curve B). Both the needles and obloids were prepared from a 35 weight percent inulin aqueous mixture. For the needles, "I" represents needles formed from cooling from 120° F. without shear; "▲" represents needles formed from cooling from 120° F. with shear; and "○" represents needles formed from cooling from 72° F. For the obloids, ● represents obloids formed from cooling from 180° F. without shear; and □ represents obloids formed from cooling from 180° F. with shear.

For some applications, however, needle inulin crystals can be used to advantage. For example, needle morphology generally provides a higher gel strength as can be shown in FIG. 10 where curve A is the gel strength of a 35% inulin mixture cooled from 120° F. and containing needle-like crystals and curve B is the gel strength of a 35% inulin mixture cooled from 180° F. and containing obloid-like crystals. Although not wishing to limited by theory, it appears that the random orientation of the needle crystals in the compositions is responsible for the increase in gel strength. The increase in gel strength from the random orientation can be irreversibly lost by exposure the inulin needles to shear. Generally, smaller needle inulin crystals (average length of about 3 to 5 microns) will be preferred. When using inulin in needle form, it will generally be preferred that the relative amount of spray-dried particles in the inulin mixture be small (generally less than about 15 weight percent, more preferably less than about 10 weight percent, and most preferably less than about 1 weight percent). Thus, for a 35 weight percent inulin solution, the aqueous mixture is preferably heated to about 110° to 140° F. and then cooled to minimize the pressure of spray dried fragments.

Moreover, as one skilled in the art will realize, mixtures of inulin needles and inulin obloids can be used to obtain varying organoleptic and physical properties. The relative proportions of needles and obloids can be determined experimentally in a given food product. For example, inulin needles could be used to increase gel strength while inulin obloids could be used to increase lubricity. Generally, however, when inulin needles are used to increase gel strength, they should be added under low shear conditions as the shear can result in the irreversible loss of gel strength. Moreover, as one skill in the art will also realize, the controlled crystal morphology of this invention can be prepared in essentially pure aqueous solution or in aqueous solutions containing other ingredients. In other words, the desired inulin crystal morphology can be obtained in situ during the formation of, for example, food composition so long as the food composition contains sufficient water and can be heated to the desired temperature to obtain needles or obloids.

The control of the crystal morphology of inulin and the improved results obtained when the crystalline inulin is incorporated in food products such as pourable and viscous dressings may be seen from the drawings and Examples herein.

FIGS. 1A and 1B are photomicrographs of "as is" commercially available inulin, FIG. 1A being a spray dried product and FIG. 1B being an aggregated spray dried product. As seen in FIGS. 1A and 1B, the as is spray dried products do not have a crystalline structure.

Figure 3:
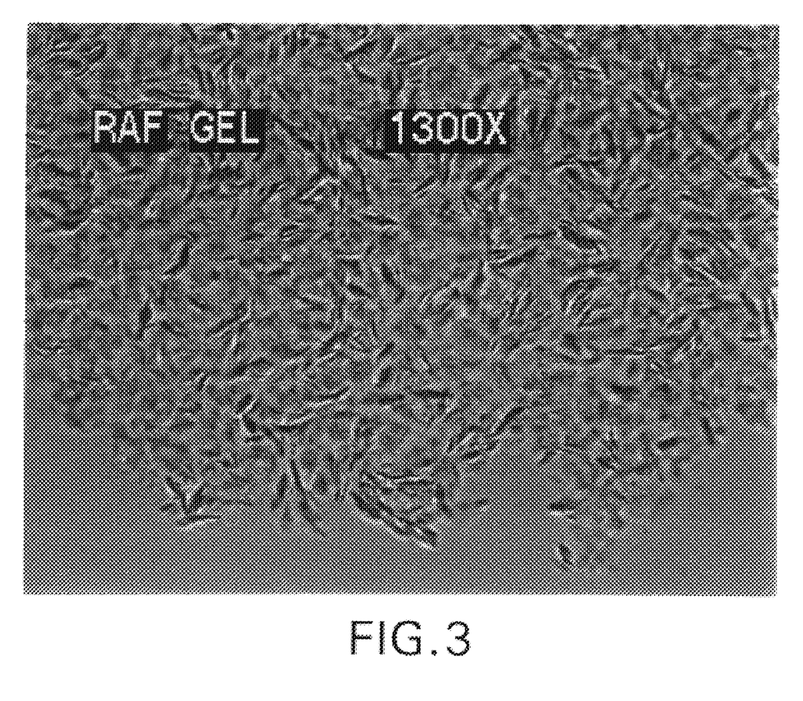
FIG. 3 is a photomicrograph of needle-shaped inulin prepared by the method of this invention by cooling a 35 weight percent aqueous inulin mixture from about 120° F. Essentially no spray-dried fragments can be seen in this Figure.
Figure 4A:
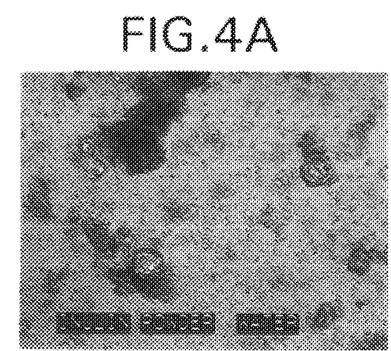
FIGS. 4A, 4B, 4C, and 4D are photomicrographs of commercially available inulin (spray dried) mixed with water at ambient temperature without shear showing the presence of significant large spray-dried fragments along with small irregular fragments.
Figure 4B:
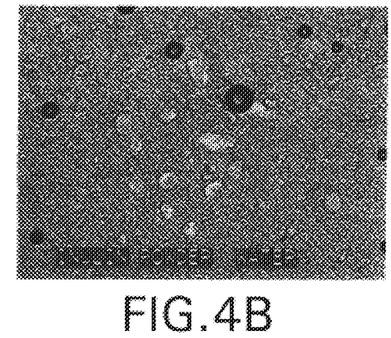
Figure 4C:
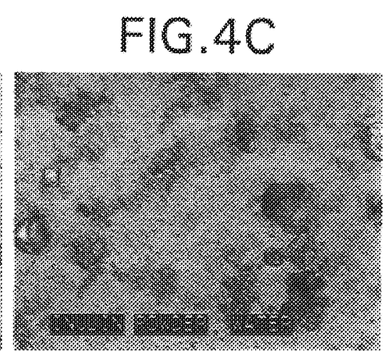
Figure 4D:
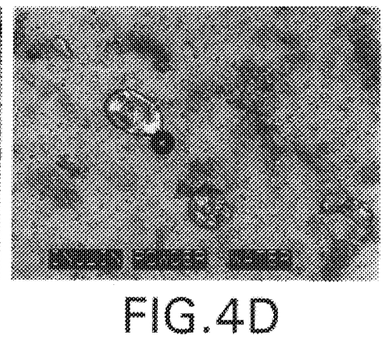
Figure 5A:
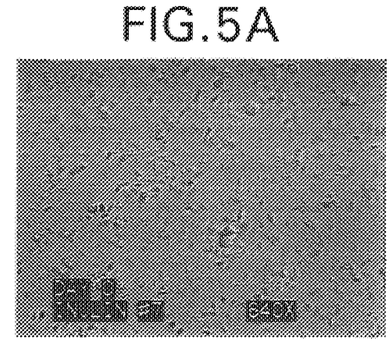
FIGS. 5A, 5B, 5C and 5D are photomicrographs of commercially available spray dried inulin mixed with water with shear showing shattered spray-dried fragments and small irregular fragments of the spray-dried particles.
Figure 5B:
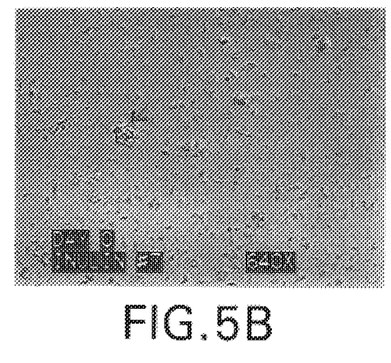
Figure 5C:
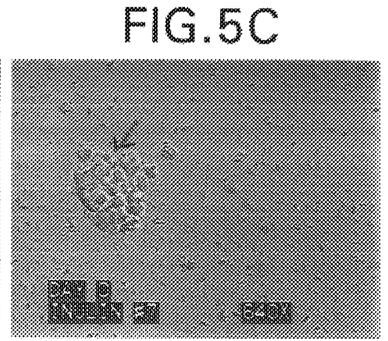
Figure 5D:
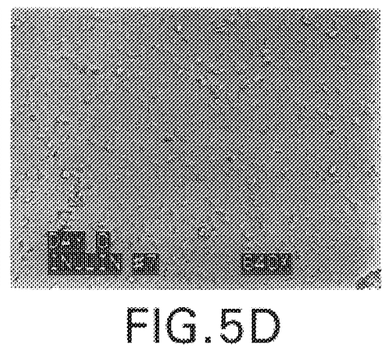
Figure 6A:
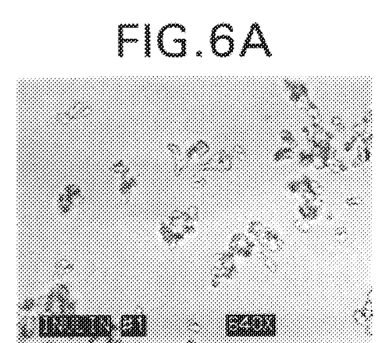
FIGS. 6A, 6B, 6C, and 6D are photomicrographs of a 35 weight percent inulin aqueous mixture cooled from 180° F. to 45° F. without shear to produce obloids.
Figure 6B:
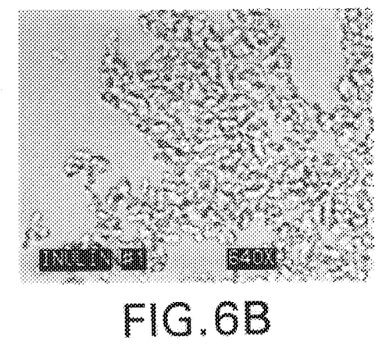
Figure 6C:
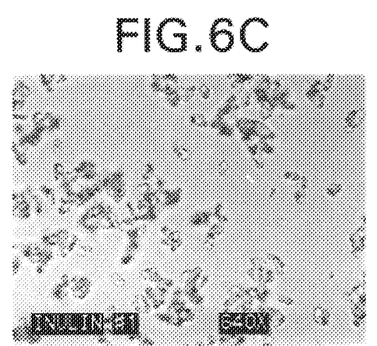
Figure 6D:
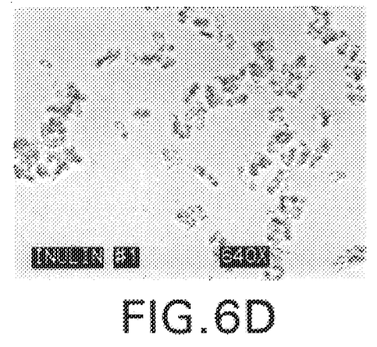
Figure 7A:
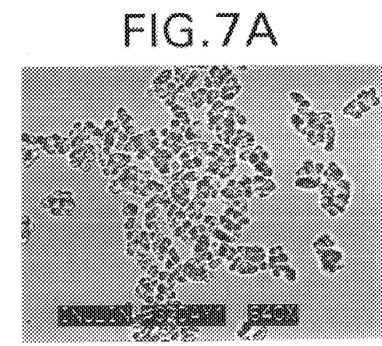
FIGS. 7A, 7B, 7C, and 7D are photomicrographs of a 35 weight percent inulin aqueous mixture cooled from 180° F. to 45° F. with shear to produce aggregated obloids.
Figure 7B:
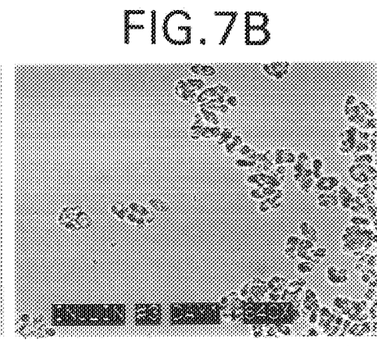
Figure 7C:
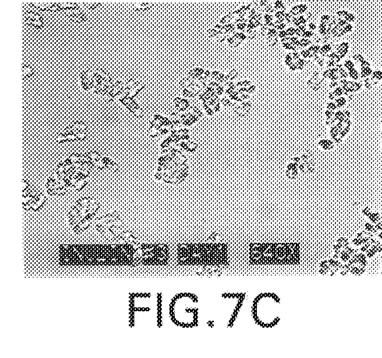
Figure 7D:
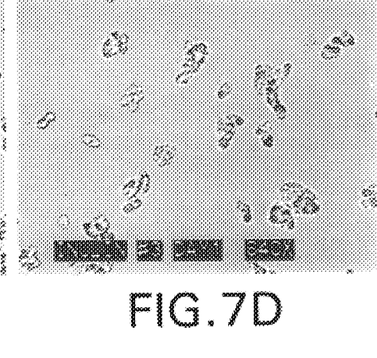
Figure 8A:
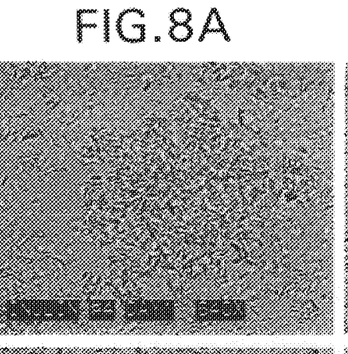
FIGS. 8A, 8B, 8C, and 8D are photomicrographs of a 35 weight percent inulin aqueous mixture cooled from 120° F. to 45° F. without shear to produce needles and a few spray-dried fragments.
Figure 8B:
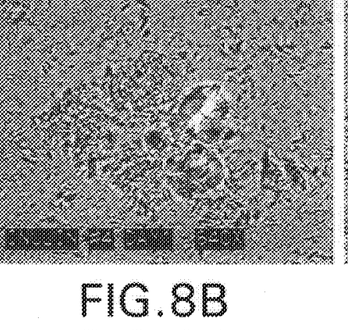
Figure 8C:
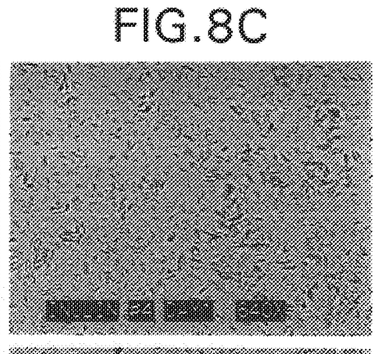
Figure 8D:
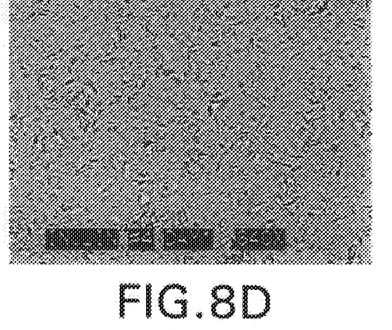
Figure 9A:
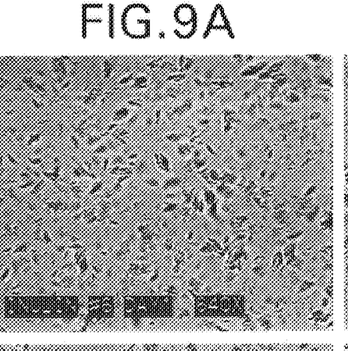
FIGS. 9A, 9B, 9C, and 9D are photomicrographs of a 35 weight percent inulin aqueous mixture cooled from 120° F. to 45° F. with shear to produce aggregated needles and a few spray-dried fragments.
Figure 9B:
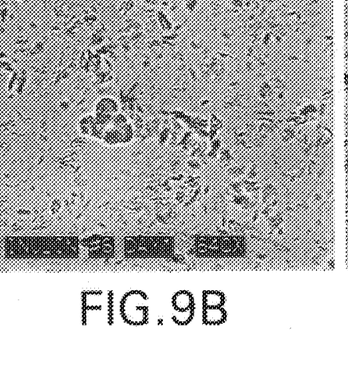
Figure 9C:
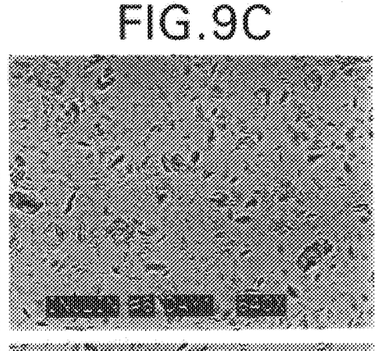
Figure 9D:
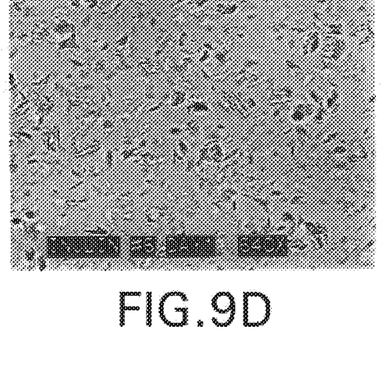

The obloid crystal morphology obtained by heating a 35% aqueous inulin mixture to about 180° F. to dissolve all needle nuclei followed by cooling is shown in FIGS. 2A–2D. The absence of needle-like crystals and spray dried fragments can be seen in FIGS. 2A–2D. The needle-like crystal morphology and the absence of spray dried fragments obtained by heating a 35% aqueous inulin mixture to about 120° C. followed by cooling is shown in FIG. 3.

FIGS. 4A–4D show a spray dried inulin suspended in water on a slide at ambient conditions without heating and without shearing the mixture at a magnification of 320×. Whole spray dried particles 10 and fragmented spray dried particles 12 can be seen along with smaller irregular fragments 20.

FIG. 5 shows a 35% inulin mixture that has been subjected to shear (overhead mixer at 250 rpm) at room temperature without heating at 640×. Shattered fragments 30 and small irregular fragments 20 similar to those seen in FIG. 4 are present. The crystal morphology seen in FIG. 5 does not resemble that seen in FIGS. 2 and 3.

FIGS. 6 and 7, respectively, show a 35% aqueous inulin mixture heated to 180° F. and cooled to 45° F. with and without shear. Both Figures show obloid crystal formation with no visible needle-like crystals. FIG. 7 shows the aggregated structure imparted by shearing during cooling.

FIGS. 8 and 9 show the needle-like crystal morphology, as opposed to obloid morphology, that is obtained when a 35% aqueous inulin mixture is heated to 120° F. and cooled to 45° F. as compared to being heated to 180° F.

Figure 11:
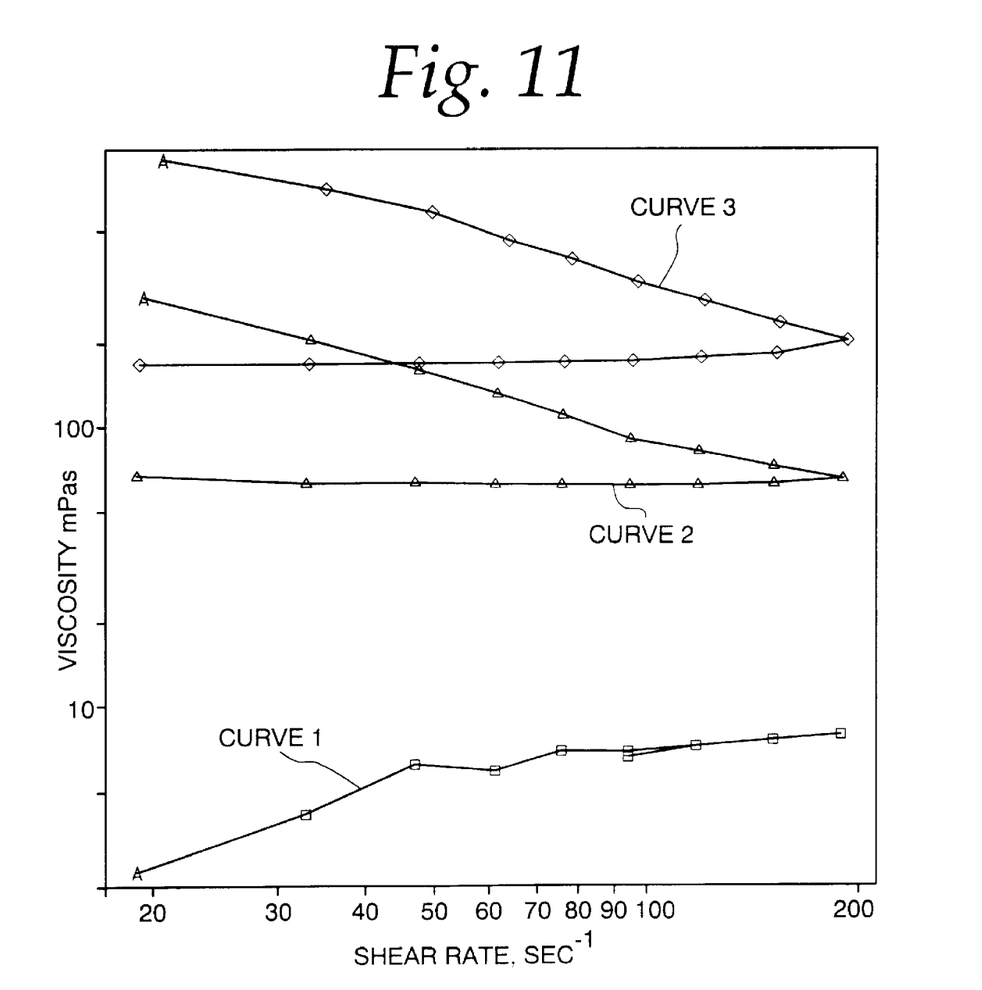
FIG. 11 shows the viscosity behavior of obloid crystals as a function of shear rate. Curve 1 is the viscosity of a 35 weight percent inulin aqueous solution at 180° F. (i.e., before cooling). V-shaped curve 2 is the same solution after cooling from 180° F. without shear showing viscosity under increasing and then decreasing shear starting from "A". V-shaped curve 3 is the same solution after cooling from 180° F. with shear showing viscosity under increasing and then decreasing shear starting from point "A".

FIG. 11, which plots storage modulus (G) vs. percent strain demonstrates that the needle-like crystal morphology imparts a much higher gel strength than does the obloid morphology. The gel is somewhat hard and brittle and the gel structure is destroyed at strain levels of 15–20%.

Figure 12:
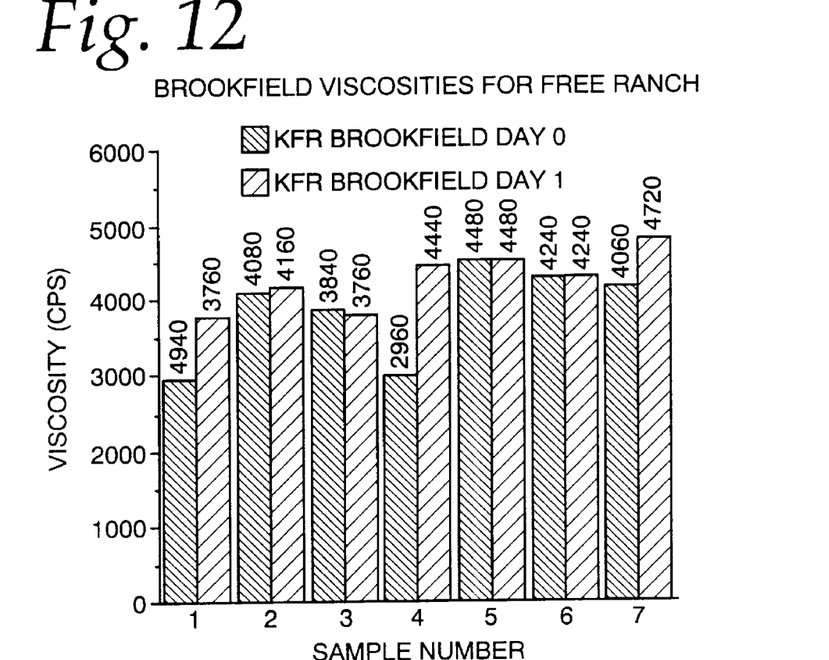

FIG. 12 are plots of viscosity vs. shear rate for a 35% aqueous inulin mixture heated to 180° F. (Curve 1); heated to 180° F. and cooled to ambient with shear (Curve 2); and heated to 180° F. and cooled without shear. "A" represents the starting point or initial viscosity. For V-shaped curves 2 and 3, the shear rate was increased over time to a maximum of about 200 $sec^{-1}$ and then decreased to zero over time.

The following specific examples further illustrate the invention and the advantages thereof.

EXAMPLE 1

Inulin (about 300 g of Instant Fibruline from Cosuera) was placed in about 700 g of 120° F. water and agitated with an overhead Lightning Mixer at about 150 rpm for about 5 minutes. The dispersed inulin mixture was placed in a refrigerator at about 45° F. for about 24 hours. Inulin needles were obtained with an average length of about 7 microns. The photomicrographs revealed a structure generally similar to FIG. 8.

EXAMPLE 2

Inulin (about 300 g of Instant Fibruline from Cosuera) was placed in about 700 g of 180° F. water and agitated with an overhead Lightning Mixer at about 150 rpm for about 5 minutes. The inulin mixture was placed in a refrigerator at about 45° F. for about 24 hours. The sample cooled from about 176° F. to about 46° F. over a period of about 2 hours.

Approximately elliptical inulin particles (i.e., obloids) were obtained with an average major diameter of about 8 microns.

EXAMPLE 3

Samples of inulin (Instant Fibruline from Cosuera) were prepared as a 35 weight percent mixture in water. These samples were then heated to various elevated temperatures and then cooled to about 45° F. at a cooling rate of about 0.15° F./min without shear. The following results were obtained:

| Temp. (°F.) | Needles | | Obloids | | Spray-Dried Particles |
|---|---|---|---|---|---|
| | Percent | Average Length (μm) | Percent | Average Diameter (μm) | |
| 45–72 | 70 | 2–3 | 0 | — | 30 |
| 72–110 | 85 | 2–3 | 0 | — | 15 |
| 110–120 | 98 | 3–5 | 0 | — | 2 |
| 120–140 | 99.5 | 5–7 | 0 | — | 0.5 |
| 140–170 | 99.9 | 7–15 | 0 | — | 0.1 |
| 170–180 | 0 | — | 100 | 3–5 | 0 |
| 180–210 | 0 | — | 100 | 7–15 | 0 |

If the 35% inulin mixture is heated to about 175° F. or above, only obloids are formed upon cooling. If the inulin solution is heated to less than about 170° F., no obloids are formed upon cooling. The effect of heating to about 170° to 175° F. will depend on whether any needle crystals remain in the mixture which can serve as nucleation seeds remain in the mixture. If the temperature is maintained for a sufficiently long time to dissolve essentially all needle crystals, only obloid crystals will result. If sufficient needle crystals remain to act as nuclei, then needle crystals will result.

As can be seen in the table, as the temperature is raised (but maintained below the crystal transition temperature), the amount of spray-dried particles decrease and the size of the needle crystals increases. At temperatures above the crystal transition temperature, only obloids (with essentially no needle crystals or spray-dried particles) are obtained. The size of the obloid crystals increases with increasing temperature.

EXAMPLE 4

A number of pourable dressings was prepared from the following basic formula:

| Ingredients | Wt. % |
|---|---|
| Part A | |
| Water | 35.6 |
| Inulin (35% aqueous mixture) | 20.0 |
| Vinegar | 4.5 |
| Salt | 1.0 |
| Sugar | 3.0 |
| Corn Syrup | 15.0 |
| Flavor | 0.5 |
| Part B | |
| Buttermilk | 20.0 |
| Xanthan | 0.4 |

The buttermilk and xanthan gum (Part B) were mixed together and pasteurized at 180° F. followed by cooling to room temperature. The water and aqueous inulin mixture were mixed together in a suitable blender and the remaining ingredients of Part A were added and mixed. Part A and B were blended together at room temperature and filled into containers.

Six pourable dressings were prepared containing inulin slurries processed in accordance with the present invention prior to incorporation in the pourable dressing. The processing conditions for the six samples and a control sample (Sample 7) were as follows:

| Sample | Hydration Temp (°F.) | Cooling | Shear with Cooling | Crystal Morphology |
|---|---|---|---|---|
| 1 | 180 | No | — | Obloid (in situ) |
| 2 | 180 | Yes | No | Obloid |
| 3 | 180 | Yes | Yes | Agglomerated Obloid |
| 4 | 120 | No | — | Needle (in situ) |
| 5 | 120 | Yes | No | Needle |
| 6 | 120 | Yes | Yes | Agglomerated Needle |
| 7 | 72 | — | — | Spray Dried Particle (Needle) |

The results of Brookfield viscosity measurements made on Day 0 and Day 1 of the seven pourable dressings are set forth in FIG. 12. Comparing Day 0 and Day 1 viscosities for Samples 1 and 2 and 4 and 5 (hot vs. cooled obloid and needle crystal forms), it appears there is less initial viscosity change if the inulin mixture is cooled sufficiently to cause crystal formation before being incorporated into a pourable dressing formulation.

EXAMPLE 5

Inulin samples processed as set forth in Example 4 were incorporated in the following basic viscous (emulsified) dressing formulation:

| Ingredients | Wt. % |
|---|---|
| Part A | |
| Water | 21.43 |
| Inulin (35% aqueous mixture) | 28.57 |
| Sugar | 3.0 |
| Flavor | 0.5 |
| Xanthan | 0.4 |
| Part B | |
| Water | 30.15 |
| Starch (modified waxy) | 4.0 |
| Vinegar | 10.0 |
| Sodium Benzoate | 0.1 |
| Mustard | 0.5 |
| TiO2 | 0.15 |
| Salt | 1.2 |

The ingredients of Part B were heated in a jacketed vessel under agitation to 180° F. for 5 minutes and cooled to room temperature. The inulin and water components of Part A were mixed in a Hobart mixer until homogeneous after which the remaining ingredients of Part A were added and mixed. Part B was mixed with Part A in the Hobart mixer and the resulting mixture was passed through a colloid mill operated at standard conditions to provide a homogeneous viscous dressing which was filled into containers.

Figure 13:
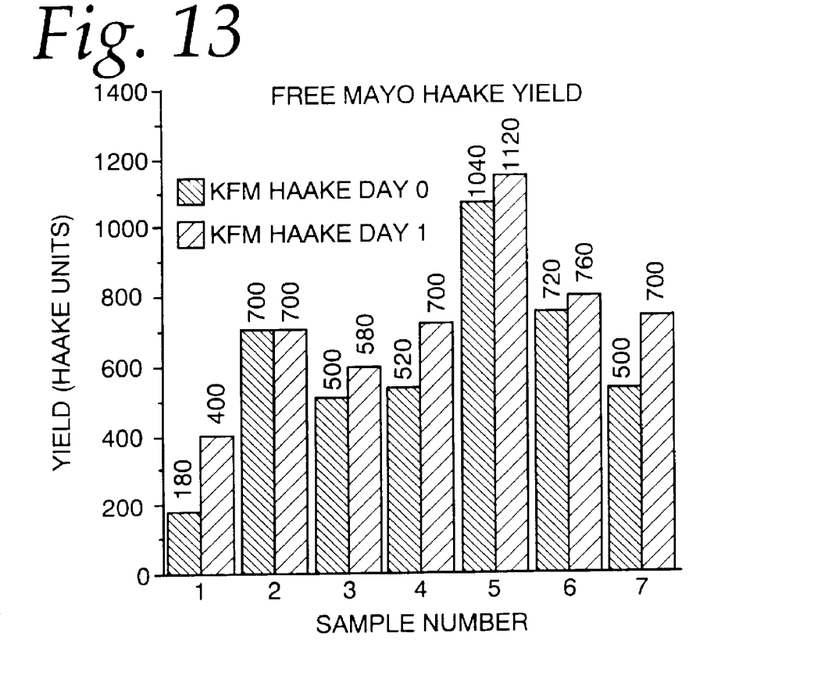

FIG. 13 shows the Haake yield values for the viscous dressings (Samples 1–6 and Control Sample 7). As occurred with the pourable dressings of Example 4, comparing Samples 1 and 2 and 4 and 5 shows a lesser initial viscosity change when crystal formation is allowed to occur, i.e., the heated solution is allowed to cool, before incorporating the inulin in a finished viscous dressing formulation. It is also seen in FIG. 13 that the non aggregated needle-like crystal morphology of Sample 5 gave the highest viscosity viscous dressing as compared to all other samples, including Control Sample 7.

Inulin processed in accordance with the present invention has been found to be particularly advantageous when incorporated in low fat or no fat pourable dressings as a replacement for a majority or all of the triglyceride oil present in full fat or conventional dressings for salad.

In this connection, inclusion of between about 3 and 10 percent, preferably between about 6 and 9.5 percent of inulin processed in accordance with the invention has been found to provide a dressing formulation that has a mouthfeel when tasted that closely approximates the mouthfeel of a full fat counterpart of that dressing. The obloid inulin morphology provides particularly good results.

The fat content of a conventional, i.e., full fat dressing plays an important role in the organoleptic sensation encountered when the dressing is eaten. One of the dominant sensations perceived in the mouth is texture which relates to how long a person tasting a sample perceives the existence of the product in the mouth, either in bulk form or as a thin film or coating. The duration of time that a product can be felt, usually measured in seconds can be reliably determined, on a comparative basis, by experienced tasters.

Experience gained by virtue of tasting large numbers of pourable dressings has established that the intensity or feel of a full fat conventional dressing generally persists for upwards of 40 seconds. Known fat free dressings, which generally depend upon gums, starches, cellulose, etc. to impart texture simulating fat, generally lose intensity or perception of mouthfeel after 20–25 seconds, roughly half that of a full fat counterpart dressing.

When inulin having the needle-like and obloid crystal morphology obtained by the present invention are incorporated in pourable dressings, for example, buttermilk based dressings, the feel of the dressing in the mouth is felt for a longer period of time as compared to conventional no fat dressings, for example, for a time of 30–40 seconds as compared to 20–25 seconds. Inulin having an obloid crystal morphology generally provided a perceptible mouthfeel for a longer period of time, in excess of 35 seconds, than does the needle-like crystals.

The following examples illustrate pourable buttermilk type no fat dressings incorporating obloid inulin crystals. In Example 6, a 35% aqueous inulin mixture was heated to 180° F. and cooled to ambient conditions before being incorporated into the dressing formulation. In Example 7, the inulin was incorporated in the buttermilk slurry prior to pasteurization of the slurry at 180° F. Upon cooling of the pasteurized slurry obloid, inulin crystals were formed in situ.

EXAMPLE 6

A buttermilk type pourable dressing was prepared according to the following formulation:

| Ingredients | Wt. % |
| --- | --- |
| Part A | |
| Water | 14.7335 |
| Liquid flavors | 5.6736 |

-continued

| Ingredients | Wt. % |
| --- | --- |
| Low DE corn syrup | 29.0989 |
| Dried flavors | 3.7443 |
| Potato maltodextrin | 1.00 |
| Preservative | 3.0420 |
| Color | 0.200 |
| Gums | 0.600 |
| Herbs/Spices | 0.1200 |
| Part B | |
| Low fat cultured buttermilk | 20.0000 |
| Water | 2.7193 |
| Salt | 1.6457 |
| Acid | 0.2500 |
| Part C | |
| Inulin | 6.0000 |
| Water | 11.1429 |
| Total | 100.0000 |

EXAMPLE 7

A no-fat buttermilk dressing is prepared having the following formulation:

| Ingredients | Wt. % |
| --- | --- |
| Part A | |
| Water | 25.8764 |
| Liquid flavors | 5.6736 |
| Low DE corn syrup | 29.0989 |
| Dried flavors | 3.7443 |
| Potato maltodextrin | 1.00 |
| Preservative | 3.0420 |
| Color | 0.200 |
| Gums | 0.600 |
| Herbs/Spices | 0.1200 |
| Part B | |
| Low fat cultured buttermilk | 20.0000 |
| Inulin | 6.0000 |
| Water | 2.7193 |
| Salt | 1.6457 |
| Acid | 0.2500 |
| Total | 100.0000 |

The buttermilk slurry containing as received spray dried inulin is pasteurized by heating to 180° F. followed by cooling to ambient conditions. Heating of the slurry to 180° F. causes dissolution or melting of all of the inulin particles and upon cooling obloid inulin crystals are formed in situ. The buttermilk slurry and the dressing mix are combined in a suitable mixer to form a homogeneous dressing which is introduced into suitable containers.

Testing of the dressings of Examples 6 and 7 by an experienced taster for texture perception indicated that the inulin containing dressings has a longer lasting texture perception than did conventional no-fat buttermilk dressing.

The various features of the invention which are believed to be new are set forth in the following claims.

What is claimed is:

1. A method for controlling the crystal morphology of inulin, said method comprising;
   (1) forming an aqueous mixture containing about 10 to 50 weight percent inulin, wherein the inulin has the general formula $GF_n$ where G represents a glucose ring, F represents a fructose ring, and the average value of n is about 2 to about 15;

(2) heating the aqueous mixture either to a temperature below or to a temperature above a crystal transitional temperature for the mixture and maintaining that temperature for at least about five minutes; and (3) cooling the heated aqueous mixture to ambient temperature to obtain at least 70 weight percent inulin needle-like crystals if the temperature in step (2) is below the crystal transitional temperature or to obtain obloid inulin crystals with essentially no needle-like crystals if the temperature in step (2) is above the crystal transition temperature.

2. The method as defined in claim 1 wherein the average value of n is about 6 to 12 and the inulin has a number average molecular weight of about 1000 to about 2000.

3. The method as defined in claim 2 where the aqueous mixture contains about 20 to 40 weight percent inulin.

4. The method as defined in claim 1 wherein the temperature of step (2) is below the crystal transitional temperature and inulin needle-like crystals are obtained in step (3).

5. The method as defined in claim 4 wherein shear is applied during the cooling in step (3).

6. The method as defined in claim 5 wherein the applied shear is less than about 1000 $\sec^{-1}$.

7. The method as defined in claim 1 where the temperature of step (2) is above the crystal transitional temperature and obloid inulin crystals are obtained in step (3).

8. The method as defined in claim 7 wherein shear is applied during the cooling in step (3).

9. The method as defined in claim 8 wherein the applied shear is less than about 1000 $\sec^{-1}$.

10. A method for controlling the crystal morphology of inulin, said method comprising:

(1) forming an aqueous mixture containing about 10 to 50 weight percent spray-dried inulin, wherein the inulin has the general formula $GF_n$ where G represents a glucose ring, F represents a fructose ring, and the average value of n is about 2 to about 15;

(2) heating the aqueous inulin mixture to a temperature below a crystal transition temperature for the mixture such that a sufficient number of inulin seed crystals are present in the mixture; and (3) cooling the aqueous mixture of step (2) to form an aqueous mixture wherein at least 70 weight percent of the inulin is in the form of needle-like crystals.

11. The method as defined in claim 10 wherein the average value of n is about 6 to 12 and the inulin has a number average molecular weight of about 1000 to about 2000.

12. The method as defined in claim 11 where the aqueous mixture contains about 20 to 40 weight percent inulin.

13. The method as defined in claim 10 wherein shear is applied during the cooling in step (3).

14. The method as defined in claim 13 wherein the applied shear is less than about 1000 $\sec^{-1}$.

15. The method as defined in claim 10 wherein the needle-like crystals have an average ratio for their minor axis length to major axis length of less than about 0.3.

16. The method as defined in claim 15 wherein the average ratio for their minor axis length to major axis length is about 0.1 to about 0.3.

17. A method for controlling the crystal morphology of inulin, said method comprising:

(1) forming an aqueous mixture containing about 10 to 50 weight percent spray-dried inulin, wherein the inulin has the general formula $GF_n$ where G represents a glucose ring, F represents a fructose ring, and the average value of n is about 2 to about 15;

(2) heating the aqueous inulin mixture to a temperature above a crystal transition temperature for the mixture and holding the aqueous mixture at that temperature for a time sufficient to insure that essentially no inulin needles remain to act as seed crystals; and (3) cooling the aqueous mixture of step (2) to form an aqueous mixture containing obloid inulin crystals with essentially no inulin needles or spray-dried particles.

18. The method as defined in claim 17 wherein the average value of n is about 6 to 12 and the inulin has a number average molecular weight of about 1000 to about 2000.

19. The method as defined in claim 18 where the aqueous mixture contains about 20 to 40 weight percent inulin.

20. The method as defined in claim 17 wherein shear is applied during the cooling in step (3).

21. The method as defined in claim 20 wherein the applied shear is less than about 1000 $\sec^{-1}$.

22. The method as defined in claim 17 wherein the obloid inulin crystals have an average ratio for their minor axis length to major axis length of greater than about 0.5.

23. The method as defined in claim 22 wherein the average ratio for their minor axis length to major axis length is about 0.6 to about 0.8.

24. A method for controlling the crystal morphology of inulin, said method comprising;

(1) forming an aqueous mixture containing about 10 to 50 weight percent inulin, wherein the inulin has the general formula $GF_n$ where G represents a glucose ring, F represents a fructose ring, and the average value of n is about 6 to about 12;

(2) heating the aqueous mixture either to a temperature below or to a temperature above a crystal transitional temperature for the mixture and maintaining that temperature for at least about five minutes; and (3) cooling the heated aqueous mixture to ambient temperature to obtain at least 70 weight percent inulin needle-like crystals if the temperature in step (2) is below the crystal transitional temperature or to obtain obloid inulin crystals with essentially no needle-like crystals if the temperature in step (2) is above the crystal transition temperature.

25. A method for controlling the crystal morphology of inulin, said method comprising:

(1) forming an aqueous mixture containing about 10 to 50 weight percent spray-dried inulin, wherein the inulin has the general formula $GF_n$ where G represents a glucose ring, F represents a fructose ring, and the average value of n is about 6 to about 12;

(2) heating the aqueous inulin mixture to a temperature below a crystal transition temperature for the mixture such that a sufficient number of inulin seed crystals are present in the mixture; and (3) cooling the aqueous mixture of step (2) to form an aqueous mixture wherein at least 70 weight percent of the inulin is in the form of needle-like crystals.

26. A method for controlling the crystal morphology of inulin, said method comprising:

(1) forming an aqueous mixture containing about 10 to 50 weight percent spray-dried inulin, wherein the inulin has the general formula $GF_n$ where G represents a glucose ring, F represents a fructose ring, and the average value of n is about 6 to about 12;

(2) heating the aqueous inulin mixture to a temperature above a crystal transition temperature for the mixture and holding the aqueous mixture at that temperature for a time sufficient to insure that essentially no inulin needles remain to act as seed crystals; and (3) cooling the aqueous mixture of step (2) to form an aqueous mixture containing obloid inulin crystals with essentially no inulin needles or spray-dried particles.

* * * * *

UNITED STATES PATENT AND TRADEMARK OFFICE
CERTIFICATE OF CORRECTION

PATENT NO. : 5,840,884
DATED : November 24, 1998
INVENTOR(S) : Daniel G. Lis

It is certified that error appears in the above-indentified patent and that said Letters Patent is hereby corrected as shown below:

Column 12, line 6₂, change ";" (semi-colon) to --:-- (a colon).
Column 13, line 3, after "and" insert --for--.
Column 13, line 11, change "transition" to --transitional--.
Column 14, line 5, change "transition" to --transitional--.
Column 14, line 29, change ";" (semi-colon) to --:-- (a colon).
Column 14, line 46, change "transition" to --transitional--.
Column 14, line 55, change "transition" to --transitional--.

Signed and Sealed this

Twenty-fifth Day of May, 1999

Attest:

Q. TODD DICKINSON

*Attesting Officer*     *Acting Commissioner of Patents and Trademarks*